March 5, 1963 W. D. BAILEY 3,079,682
METHOD OF MANUFACTURE OF ANNULAR METAL ARTICLES
Filed Jan. 24, 1958 3 Sheets-Sheet 1

INVENTOR
W. D. Bailey
BY Rockwell & Bartholow
ATTORNEYS

March 5, 1963 W. D. BAILEY 3,079,682
METHOD OF MANUFACTURE OF ANNULAR METAL ARTICLES
Filed Jan. 24, 1958 3 Sheets-Sheet 2

INVENTOR
W. D. Bailey
BY Rockwell Bartholow
ATTORNEYS

March 5, 1963 W. D. BAILEY 3,079,682
METHOD OF MANUFACTURE OF ANNULAR METAL ARTICLES
Filed Jan. 24, 1958 3 Sheets-Sheet 3

INVENTOR
W. D. Bailey
BY
ATTORNEYS

United States Patent Office 3,079,682
Patented Mar. 5, 1963

3,079,682
METHOD OF MANUFACTURE OF ANNULAR
METAL ARTICLES
William Dunn Bailey, Cheshire, Conn., assignor, by mesne assignments, to Textron Inc., Providence, R.I., a corporation of Rhode Island
Filed Jan. 24, 1958, Ser. No. 710,976
5 Claims. (Cl. 29—553)

This invention relates to a new method of and apparatus for making annular metal articles having a sleeve-like body with a smooth bore and an external rib of shouldered formation symmetrically disposed between the extremities of the body, the external rib having a thickness notably greater than the end portions of the sleeve. Such an article is useful as a spacer between members mounted on a rod-like support, but it is useful for other purposes and an advantage, among others, provided by the method and apparatus herein described is the precision in the formation of the article as well as the rapidity of its production.

An object of the invention is to form an article of the kind mentioned by an improved method and apparatus and, more especially, by the use of a progressive forming machine in which a blank is cut from a rod and subjected to successive forming steps at different stations to produce the finished sleeve-like article.

In its general type the machine employed is similar to that shown in Schaeffer Patent 2,756,444, dated July 31, 1956, but in the present case the article is of a different kind and its production involves novel steps and procedures as will appear from the following description.

To these and other ends the invention consists in the novel features and novel structures hereinafter described and pointed out in the claims.

In the accompanying drawings:

FIGS. 1 and 2, in conjunction, show in horizontal section the different stations of a progressive machine of the type previously mentioned, and the action of the tools of the different stations;

As in machines of the type shown in the Schaeffer patent previously mentioned, the machine used in making the annular sleeve-like article here involved, by cold forming, has a plurality of horizontally aligned working stations at which the blank is operated upon successively, for which purpose a plurality of dies with horizontal axes are provided in a stationary die bed facing a reciprocating gate carrying members in the nature of punches which act upon the blanks while the latter are held in the dies. The dies are held in place by die holders in the die bed and the punches are held in place by holders carried by the gate, and at some stations knockout rods are used in association with the dies. At the feed end of the machine, a rod is cut off at one end to form a short blank which is transferred successively to following stations for successive forming steps.

Figure 1:
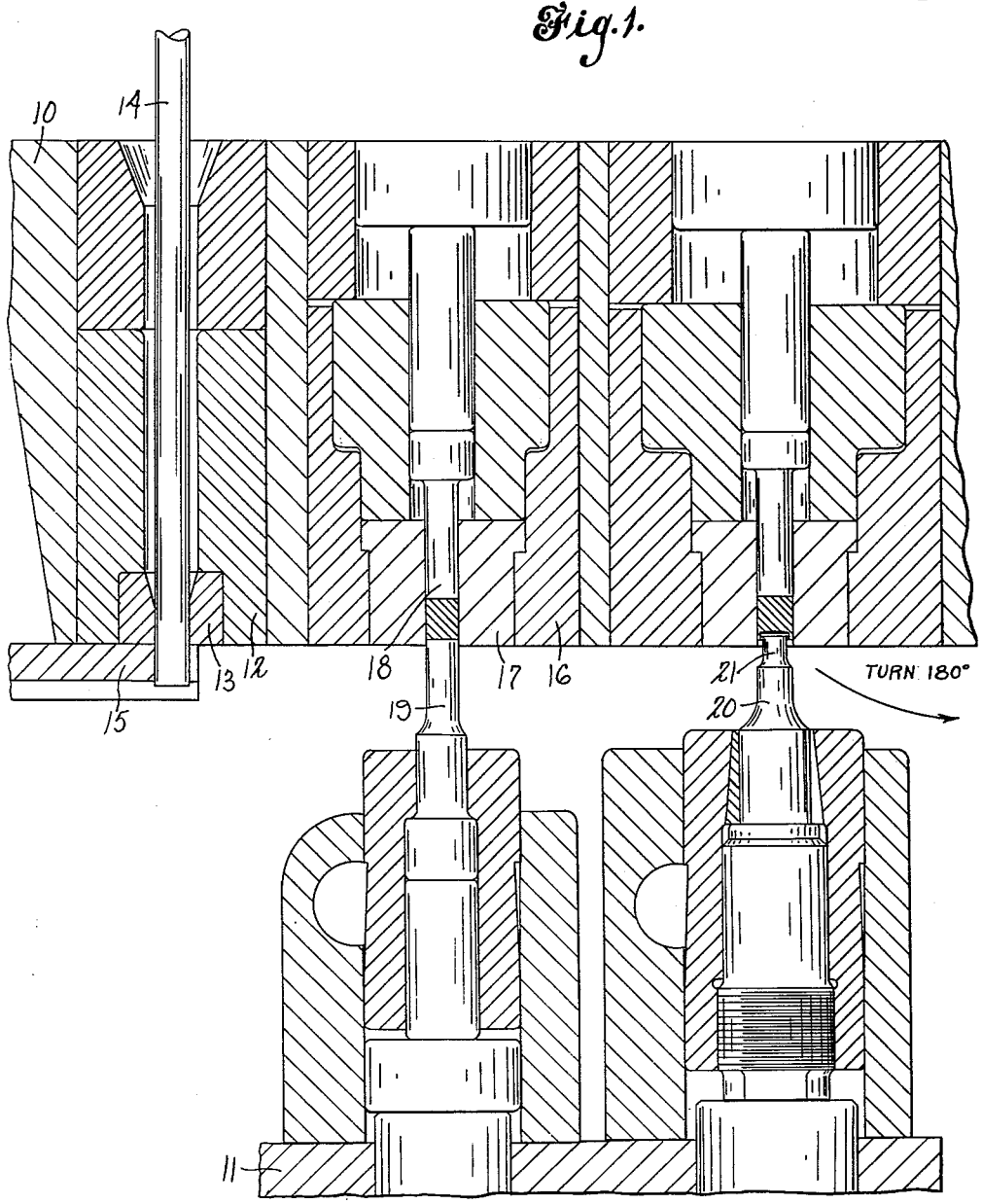

In the drawings, the die bed or block is indicated at 10 and the gate at 11. The first station is a cut-off station where the blank is cut from the rod, this being at the left of FIG. 1. The next station is one at which the blank is squared. The next station is where the blank is formed to an extent by extruding or flowing the metal. The next station is one in which the blank, reversed end for end, undergoes a second extrusion. Following this, the next station has tools which do the final forming or shaping of the blank, forming on the blank an outstanding shouldered rib. Next to this station is the last one of the series in which a web extending across the dished blank is pierced so as to bring the article to the final ring form.

The first station has a hollow die holder 12 containing a die 13 into which is fed a metal rod 14, the end of which is cut off by a reciprocating cutter 15 which by its reciprocating motion is adapted to carry the cut off piece to the second station. The second station has a die holder 16 containing a die 17 with which is associated a knock-out rod 18. Between the inner end of the rod 18 and a punch 19 mounted on a punch holder carried by the gate, the severed piece is compressed from opposite ends and accurately trued or squared so that the end faces are precisely parallel to each other.

Figure 6:
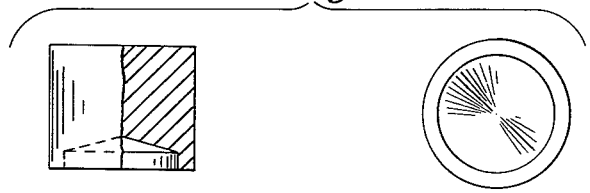
FIG. 6 shows, in partial axial section and in plan, the blank as formed by the first extrusion.

At the following station, which is No. 3, the parts mounted on the die bed are similar to those at the second station. The punch 20, however, is of different form from punch 19, having a heavy upstanding portion from which an extruding projection 21 of less diameter extends upwardly. The upper end of this projection 21 has a shallow conical upper part, the form of the projection being such as to extrude the workpiece to a certain extent and create the shallow cavity therein shown in FIG. 6. The upper face of the workpiece retains its original flat form on account of its support from the lower face of the knock-out pin.

After the extrusion step at the third station the blank is turned through 180 degrees so that the positions of the blank ends are reversed, this being accomplished by transfer means (not shown) that carry the blank to the fourth station (shown at the left of FIG. 2) and insert the blank into the die in reversed position. As shown in the drawings, the punch at the fourth station is of the same form as that at the third station, but the parts mounted on the die bed are of somewhat different structure from those at the third station. It will be noted that at station 4 a sleeve-like member 22 is mounted in the die and that a rod 23 extends downwardly through the member 22, the lower end of rod 23 having a flat face. It will also be noted that the rod 23 is under the control of a helical pressure spring 24 which serves to position the rod longitudinally after ejection of the blank. It will be apparent that the tools at the fourth station serve to indent the outwardly facing part of the blank so as to extrude the blank and change it to the shape shown in FIG. 7.

At the fifth station the final forming or shaping of the blank is accomplished, the depth of the blank being decreased while, at the same time, the rib 25 (FIG. 8) is being formed. At this station the punch holder 26 has a cylindrical bore receiving an outer punch part 27 having an interior bore 28. In the bore 28 is a punch rod or pin 29 having one end supported and guided in the member 26 and a distal end adapted to engage a recess in the blank. The end of the punch rod 29 within member 26 has a flange 30 and a helical spring 31 presses against this flange in a direction to move the punch toward the workpiece. The rod mounted in the die bed is similar to that at the fourth station. The rod, however, extends through a sleeve-like member 32 provided in the die and surrounding member 32 is a relatively thin-walled sleeve member 33. The blank, as it is received in this die of this station, has the shape shown in FIG. 7, the blank being provided with an annular axial rim-like projection at each end, these projections extending to the periphery of the blank. In the change of form the lower end of the blank (FIG. 7) is shaped by the punch 29 and a surrounding dished face of member 27 to provide the shape shown in FIG. 8, while the rib 25 is being shaped between member 27 and the sleeve member 33. While this shaping of the rib 25 is being effected, the diameter of the blank is being increased and the middle part of the blank is being thinned and shaped to the form shown in FIG. 8.

Figure 2:
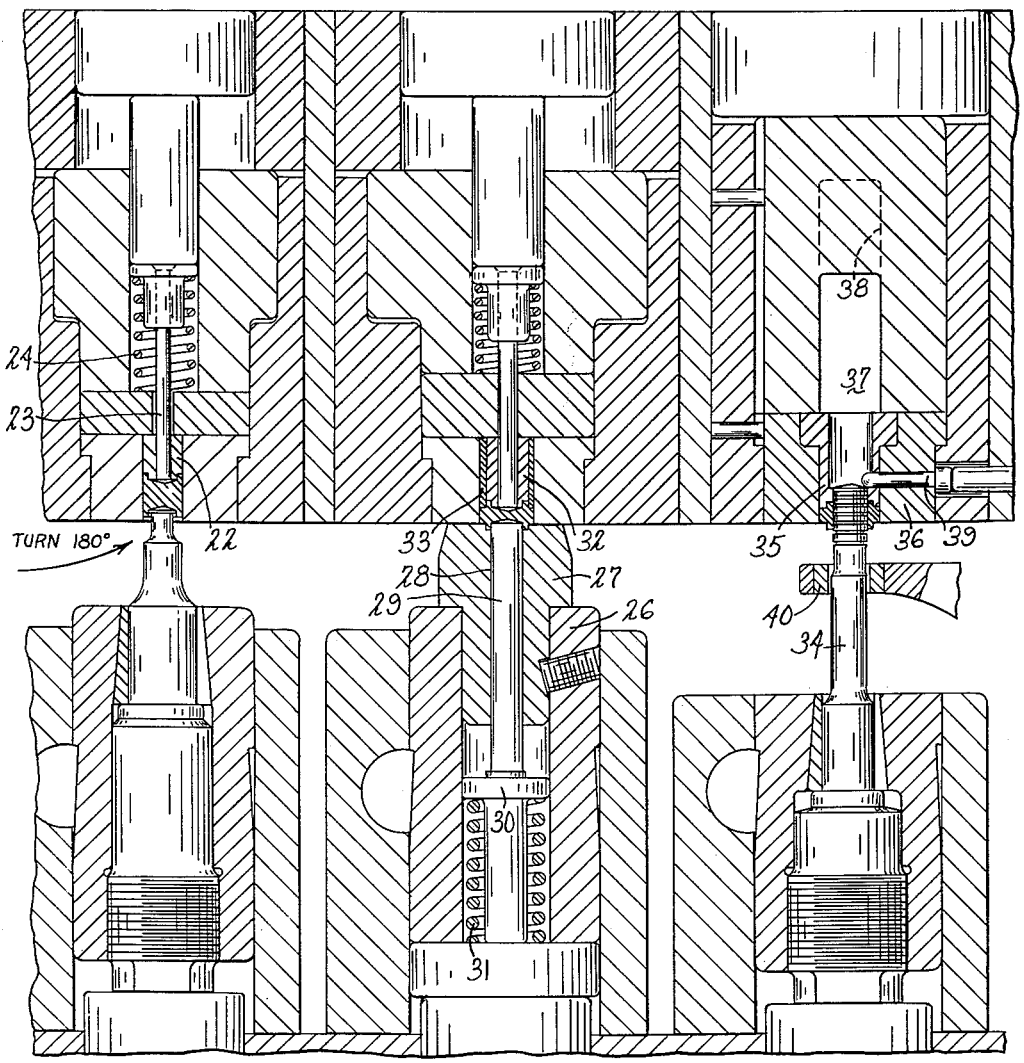
Figure 3:
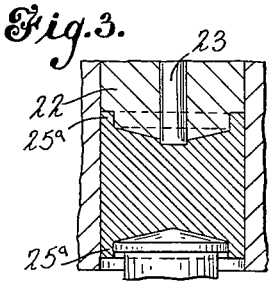
FIG. 3 is a fragmentary sectional view on a larger scale showing the action of the tools on the blank in the second extrusion operation.
Figure 5:
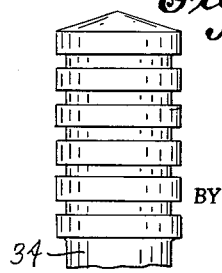
FIG. 5 is an enlarged elevation of the distal end of the piercing punch shown in FIG. 2.
Figure 9:
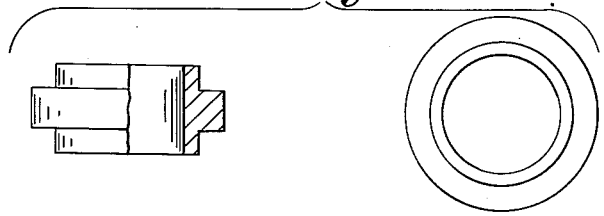
FIG. 9 is a similar view showing the finished article.
Figure 4:
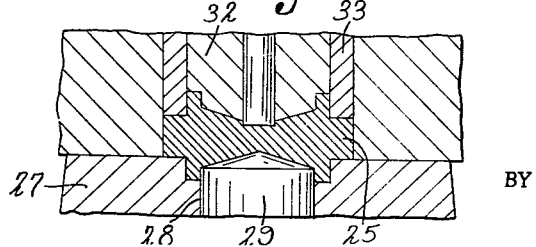
FIG. 4 is an enlarged sectional view showing the final forming of the blank.

At the sixth station a piercing operation takes place which removes the web at the middle portion of the blank and provides the blank with the hollow cylindrical interior shown in FIG. 9. At this station the gate carries a piercing punch 34 and the die has parts 35, 36 which support the peripheral part of the blank, as shown in FIG. 2. The punch 34 has a slightly tapering distal end and adjacent to this a plurality of parallel annular ribs which in passing through the blank smooth it internally. An opening 37 in the die in line with the part 35 leads laterally to a discharge recess 38 through which the web or slug can be pushed out of the die holder and die bed. A laterally slidable pin 39 prevents the slugs from dropping out of the die. A conventional stripper 40 may be used to strip the finished article from the punch.

Figure 7:
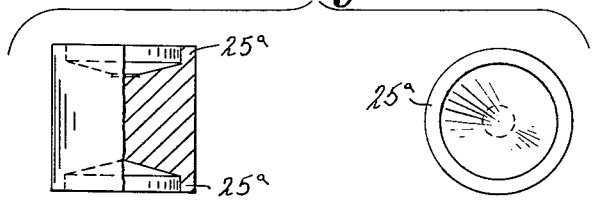
FIG. 7 is a view similar to FIG. 6 showing the blank after the second extrusion operation.
Figure 8:
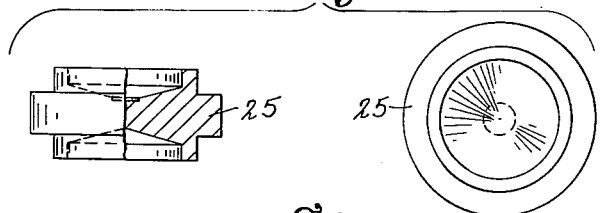
FIG. 8 is a similar view showing the blank after the final forming operation.

Comparing the section shown in FIG. 7 with that shown in FIG. 8, it is seen that in the final forming operation at the fifth station the blank is compressed endwise in order to shorten it with resultant outward displacement of the middle part of the blank to form the peripheral rib. While this is occurring, with metal flowing radially outward, the inner part of the blank located between the rim-like parts 25ª (FIG. 7) and the center of the blank is being compressed and shortened while, at the same time, retaining the shallow conical indentations that are located at opposite sides of the web. It is by this procedure that there is formed the annular article having the sleeve-like body with a smooth bore, and an external rib of shouldered formation symmetrically disposed between the extremities of the body, the external rib being of rectangular cross section and having a thickness notably greater than the rim-like relatively narrow end portions of the sleeve. Such an article can be produced from an initial piece of rod with a minimum number of steps or operations in a progressive forming machine.

Various modifications and changes in the details may be made without departing from the principles of the invention and the scope of the claims.

What I claim is:

1. The method of making an annular metal article having a sleeve-like body with a smooth bore and an external rib of shouldered formation symmetrically disposed between relatively narrow rim-like annular extremities, said method comprising truing a relatively short piece of rod stock to provide a blank, then indenting the respective side faces of the blank in two steps with intervening transfer of the blank between two die-and-punch stations to reverse the blank end for end for forming annular, axially projecting rim-like projections at the respective ends of the blank by extrusion of the metal without radially increasing the size of the blank, then at a further die-and-punch station compressing and shortening the blank while preserving the rim-like projections and forming a laterally projecting external rib on the body, intermediate the ends thereof, having a thickness notably greater than that of the rim-like projections, whereby there is formed a shallow web in the sleeve interior, and then piercing the blank at a further station to remove said web.

2. The method of making an annular metal article having a sleeve-like open body and an external rib disposed between rim-like extremities of the body, said method comprising compressing a cylindrical blank from opposite ends in a manner to extrude therefrom axially extending rim-like projections disposed around shallow conical recesses without radially increasing the size of the blank, then, while preserving said rim-like projections, further compressing the blank so as to shorten it to a considerable extent while simultaneously increasing its diameter and forming on the exterior a laterally projecting rib of rectangular cross section, intermediate the ends of the blank, and within the body a shallow web having conical depressions at opposite faces, and then piercing the blank to remove the web and smooth the interior of the body.

3. The method of making an annular metal article suitable as a spacer and having a sleeve-like body with an external rib of rectangular cross section disposed between the extremities of the body, said method comprising indenting the ends of a solid cylindrical blank at respective stations to extrude the metal at the ends of the blank in an axial direction without radially increasing the size of the blank and create at said ends axially projecting, annular rim-like extremities surrounding shallow conical depressions, then, while preserving the rim-like extremities compressing the blank from opposite ends simultaneously so as to shorten it and form therein a shallow web and form on the exterior of the blank, intermediate the ends thereof, an annular rib of greater thickness than that of the rim-like extremities, and then piercing the blank to remove the web and smooth the interior of the article.

4. The method of making an annular metal article having a sleeve-like body with an external rib disposed between the extremities of the body, said method comprising forming from a solid cylindrical blank without radially increasing the size of the blank, relatively thin-walled annular projections at the ends flush with the radially outer surface of the blank with said projections extending axially from the body of the blank and enclosing shallow recesses at the ends of the body, then, while preserving said axial projections, compressing the blank from opposite ends simultaneously so as to shorten it and form an annular, laterally extending peripheral rib on the blank, intermediate the ends thereof, and at the interior of the blank to shorten the interior to create by extrusion a relatively thin web, and then piercing the blank to remove the web.

5. A method of making an annular metal article such as a spacer or the like having a sleeve-like body with an external rib projecting laterally from an intermediate portion of the body which comprises cutting a blank from a length of solid stock, supporting the blank in a die and driving into one face thereof a punch of less diameter than that of the blank to reversely extrude the metal of the blank to form an axially projecting annular peripheral rim thereon without radially increasing the size of the blank, turning the blank end for end and transferring it to a second die and, by the action of a similar punch, reversely extruding the metal at the other face to form an annular axially extending peripheral rim thereon without radially increasing the size of the blank, and then transferring the blank to a third die and applying pressure to both faces thereof to enlarge its diameter and form a laterally projecting annular rib intermediate its ends while preserving said annular axially projecting rims.

References Cited in the file of this patent

UNITED STATES PATENTS

| 1,408,917 | Wilcox | Mar. 7, 1922 |
| 1,632,533 | Brauchler | June 14, 1927 |
| 2,207,391 | Wilcox | July 9, 1940 |
| 2,559,140 | Wilcox | July 3, 1951 |
| 2,689,359 | Friedman | Sept. 21, 1954 |
| 2,756,444 | Schaeffer | July 31, 1956 |
| 2,787,828 | Cousino | Apr. 9, 1957 |
| 2,814,812 | Stern | Dec. 3, 1957 |
| 2,832,973 | MacDonald | May 6, 1958 |
| 2,871,492 | Sciullo | Feb. 3, 1959 |
| 2,886,886 | Hartung | May 19, 1959 |
| 2,994,952 | Klooz | Aug. 8, 1961 |